US008817484B2

(12) United States Patent (10) Patent No.: US 8,817,484 B2
Fu (45) Date of Patent: Aug. 26, 2014

(54) FASTENING DEVICE FOR EXPANSION CARD

(71) Applicant: Li-Ren Fu, Shenzhen (CN)

(72) Inventor: Li-Ren Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 148 days.

(21) Appl. No.: 13/629,505

(22) Filed: Sep. 27, 2012

(65) Prior Publication Data

US 2014/0069879 A1 Mar. 13, 2014

(30) Foreign Application Priority Data

Sep. 7, 2012 (CN) .......................... 2012 1 0328549

(51) Int. Cl.
*H05K 7/14* (2006.01)

(52) U.S. Cl.
USPC ................. 361/759; 361/679.58; 361/679.32; 361/801; 248/220.21; 248/221.11

(58) Field of Classification Search
USPC ............... 361/759, 679.58, 679.32, 801, 756, 361/748, 679.41, 679.01; 248/220.21, 248/221.11, 309.1, 310, 222.13, 225.11; 312/223.2

See application file for complete search history.

(56) References Cited

U.S. PATENT DOCUMENTS

| 8,625,271 B2 * | 1/2014 | Lu et al. .................... 361/679.32 |
| 2012/0049701 A1 * | 3/2012 | Chen .......................... 312/223.2 |
| 2012/0228244 A1 * | 9/2012 | Chiu et al. ....................... 211/26 |
| 2013/0048814 A1 * | 2/2013 | Zhou ......................... 248/223.41 |

* cited by examiner

*Primary Examiner* — Robert J Hoffberg
*Assistant Examiner* — Michael Matey
(74) *Attorney, Agent, or Firm* — Novak Druce Connolly Bove + Quigg LLP

(57) ABSTRACT

A fastening device for an expansion card includes a first rack located at a front side, a second rack located at a rear side, a supporting member fastened to the first rack, and a rotating member rotatably connected to the supporting member. A pole extends up from the supporting member. When the rotating member is rotated up, a first end of the expansion card is operable to abut a top of the supporting member and the pole extends through a mounting hole defined in the first end of the expansion card. The rotating member is operable to rotate down to abut a top of the expansion card and engage with the supporting member. A second end of the expansion card opposite to the first end is fastened to the second rack.

10 Claims, 6 Drawing Sheets

FASTENING DEVICE FOR EXPANSION CARD

BACKGROUND

1. Technical Field

The present disclosure relates to a fastening device for fastening an expansion card.

2. Description of Related Art

Expansion cards are generally classified either as a full length type or as a half length type. In a server, half length of a full length type of expansion card is generally fastened to a rack and connected a riser card, and the other half length of the full length type of expansion card is dangling. The dangling end of the expansion card easily vibrates, which is harmful to data transmission of the expansion card.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
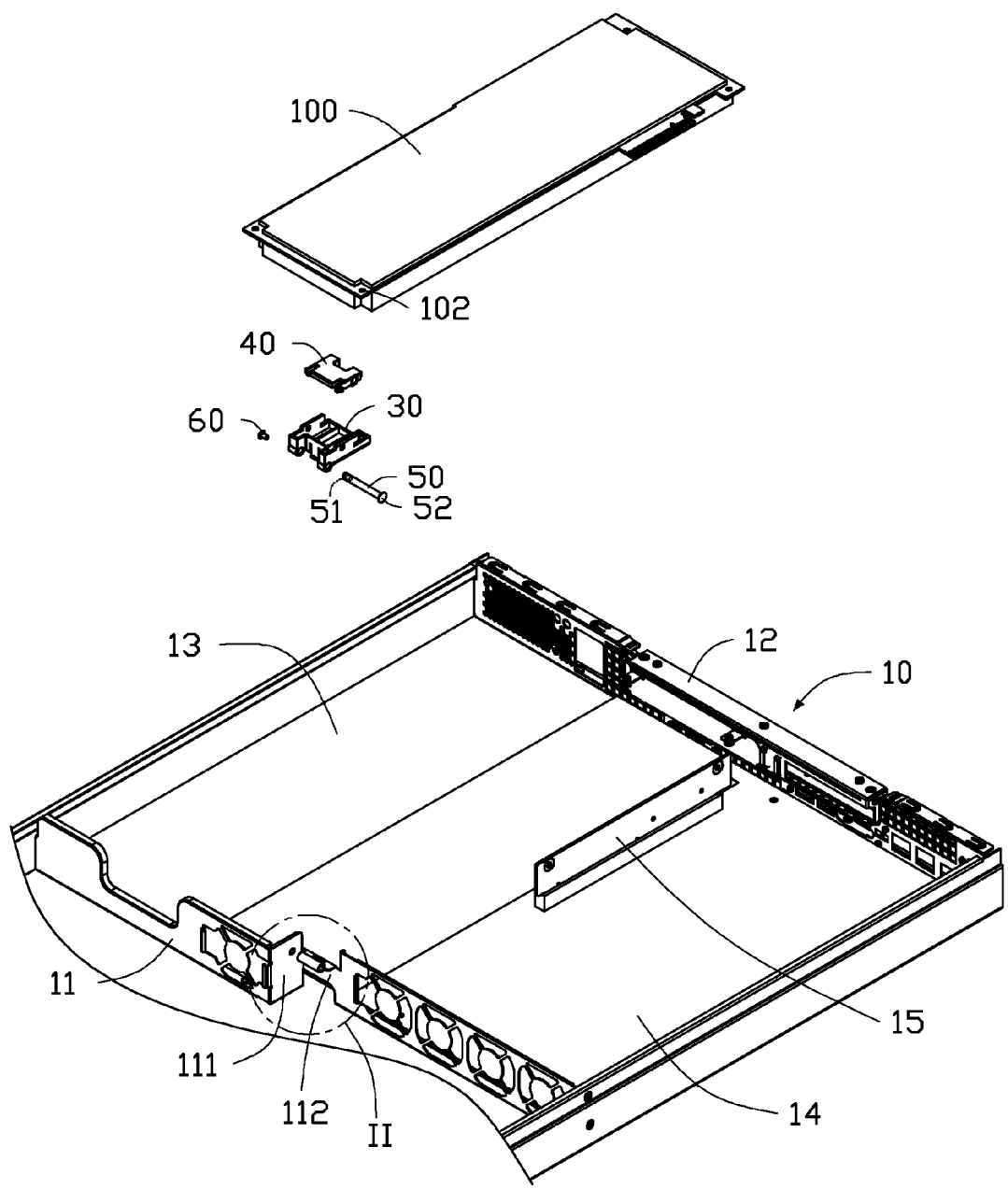
FIG. 1 is an exploded, isometric view of an exemplary embodiment of a fastening device together with an expansion card, wherein the fastening device includes a supporting member and a rotating member.

FIG. 1 shows an exemplary embodiment of a fastening device for an expansion card 100 including a chassis 10, a supporting member 30, and a rotating member 40.

The chassis 10 includes a bottom plate 14, a first rack 11 extending up from a front end of the bottom plate 14, and a second rack 12 extending up from a rear end of the bottom plate 14. A circuit board 13 is mounted on the bottom plate 14. A riser card 15 is connected to the circuit board 13, near and substantially perpendicular to the second rack 12. The expansion card 100 can be connected to the riser card 15, to communicate with the circuit board 13. A mounting hole 102 is defined in a front end of the expansion card 100.

Figure 2:
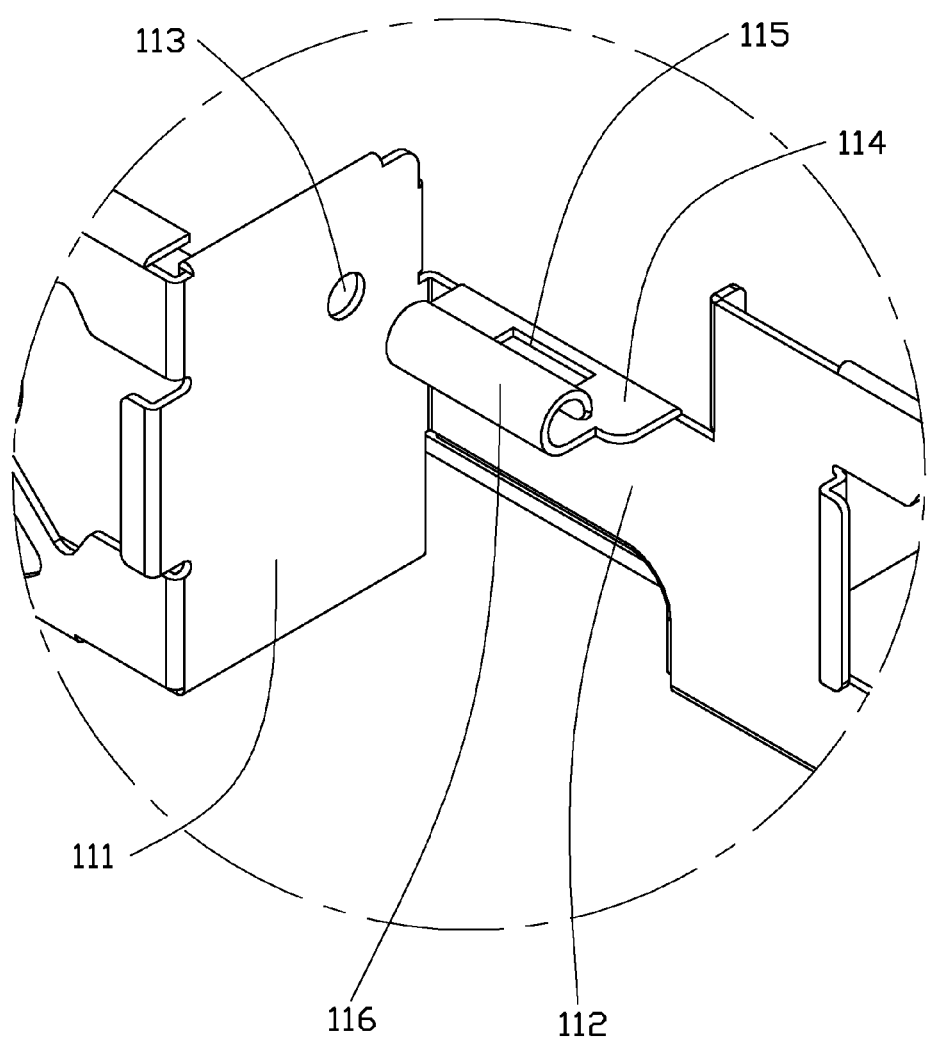
FIG. 2 is an enlarged view of a circled portion II of FIG. 1.

FIG. 2 shows the first rack 11 including a fastening plate 111 parallel to the riser card 15, and an extension plate 112 perpendicularly extending from a middle of a rear side of the fastening plate 111. A through hole 113 is defined in an upper portion of the fastening plate 111. A supporting plate 114 perpendicularly extends forward from a top side of the extension plate 112. The supporting plate 114 defines an opening 115. A sleeve 116 is formed on a front side of the supporting plate 114.

Figure 3:
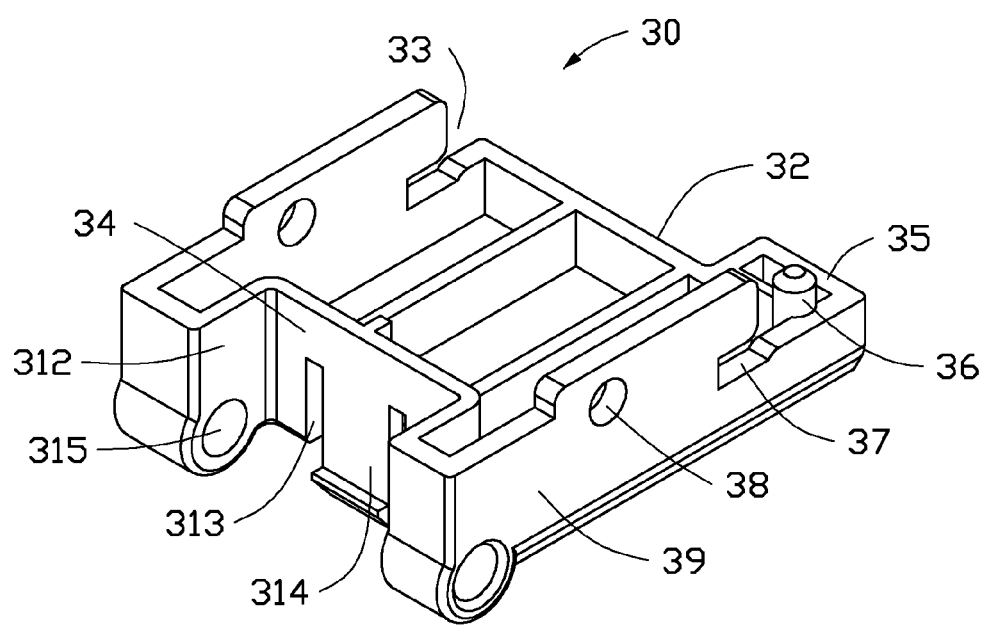
FIG. 3 is an enlarged view of the supporting member of FIG. 1.

FIG. 3 shows the supporting member 30 of the embodiment. The supporting member 30 includes a front wall 34, a rear wall 32 opposite to the front wall 34, and two opposite sidewalls 39. Two pivot portions 312 extend forward from opposite ends of the front wall 34 and are respectively connected to front ends of the sidewalls 39. A through hole 315 is defined in a lower portion of each pivot portion 312. Two grooves 313 are defined in the front wall 34, extending through a bottom side of the front wall 34. A substantially L-shaped hook 314 is formed on the front wall 34, between the grooves 313. A cutout 33 is defined in each sidewall 39, extending through a rear end of the sidewall 39. A substantially U-shaped supporting portion 35 extends back and is connected between one of the ends of the rear wall 32 and a corresponding sidewall 39, having the same height as the rear wall 32. A pole 36 protrudes up from a bottom wall of the supporting portion 35, higher than the rear wall 32. Each sidewall 39 defines a pivot hole 38, and a notch 37 communicating with the cutout 33.

Figure 4:
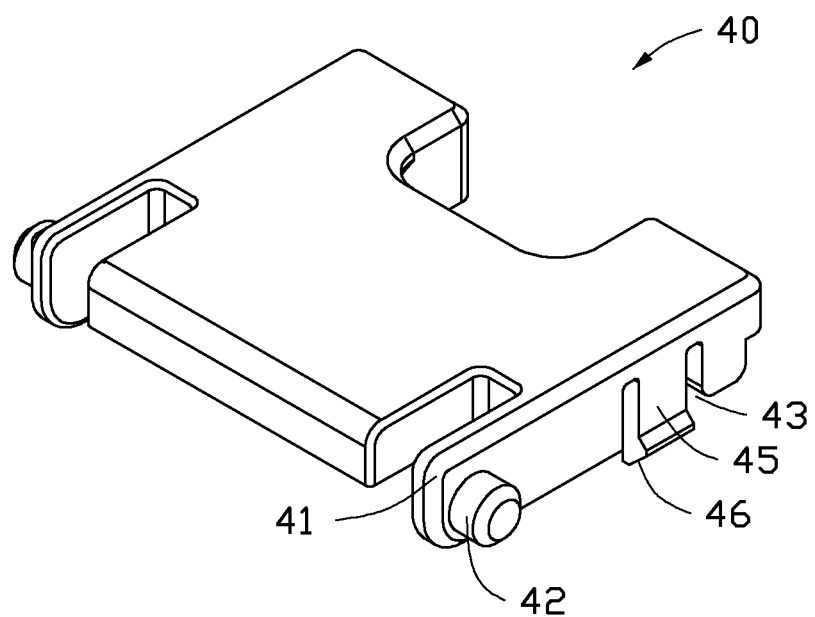
FIG. 4 is an enlarged view of the rotating member of FIG. 1.

FIG. 4 shows two resilient arms 41 are formed on opposite ends of a front side of the rotating member 40. A pin 42 protrudes from an outer side of each resilient arm 41. Two grooves 43 are defined in rear portions of each of opposite ends of the rotating member 40. A substantially L-shaped hook 45 is formed on each end of the rotating member 40, between the grooves 43. A slanting guiding surface 46 is formed on a bottom of each hook 45.

Figure 5:
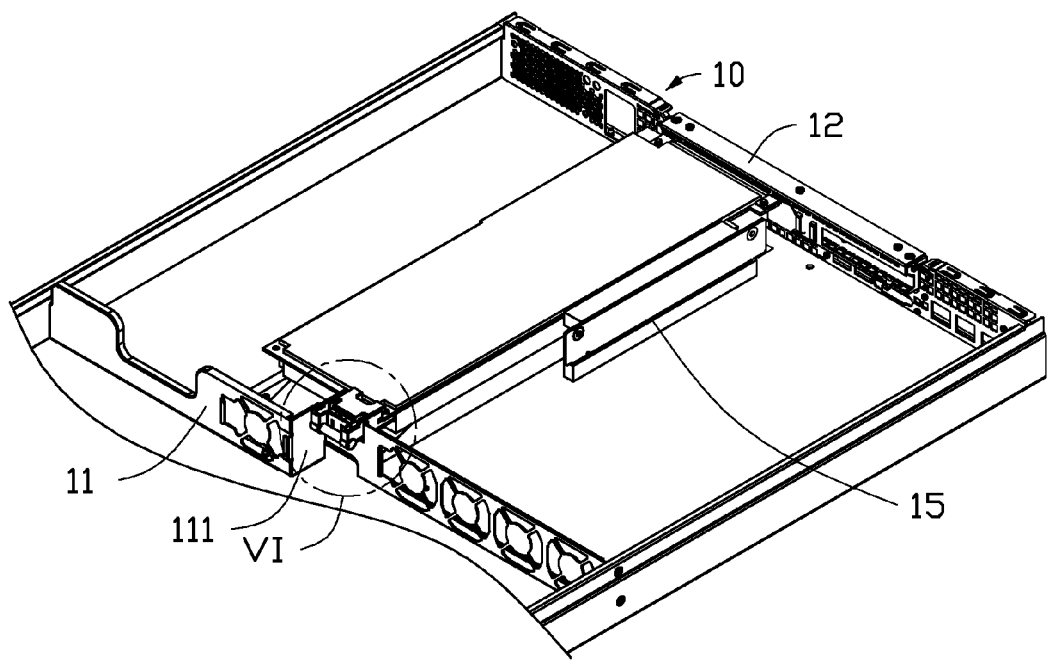
FIG. 5 is an assembled, isometric view of FIG. 1.
Figure 6:
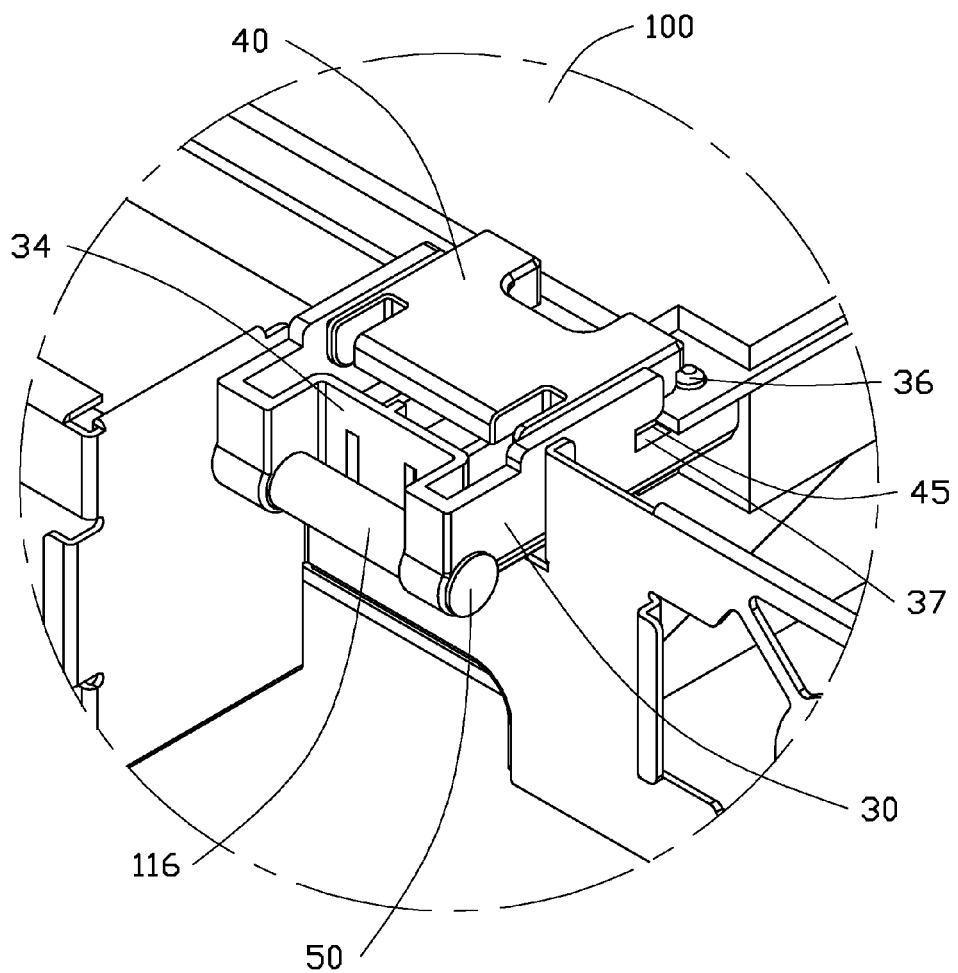
FIG. 6 is an enlarged view of a circled portion VI of FIG. 5.

FIGS. 5 and 6 show in assembly, the resilient arms 41 are deformed toward each other, to engage the pins 42 in the pivot holes 38. Guided by the guiding surfaces 46, the hooks 45 respectively engage with top walls bounding the notches 37. The supporting member 30 is placed above the supporting plate 114 and is manipulated down. The hook 314 extends through the opening 115. The supporting member 30 is moved forward after abutting the supporting plate 114, until the sleeve 116 is located between the pivoting portions 312 and aligning with the through holes 315. The hook 314 engages with a bottom surface of the supporting plate 114 near the opening 115. The fastening plate 111 abuts one of the sidewalls 39. A pin 50 extends through the through hole 315 away from the fastening plate 111, the sleeve 116, and the other through hole 315, and then engages in the through hole 113. A head 52 of the pin 50 abuts the corresponding sidewall 39. A screw hole 51 is axially defined in an end of the pin 50 opposite to the head 52. A screw 60 engages in the screw hole 51. The hooks 45 are deformed toward each other to disengage from the notches 37. The rotating member 40 can be rotated up.

A rear end of the expansion card 100 is inclined away from the riser card 15. The mounting hole 102 is aligned with the pole 36, and the expansion card 100 is manipulated down, until the expansion card 100 is placed on the supporting portion 35, the rear wall 32, and the rear ends of the sidewalls 39. The pole 36 extends through the mounting hole 102. The rear end of the expansion card 100 is rotated toward the riser card 15, to connect a corresponding side of the expansion card 100 to the riser card 15. The rear end of the expansion card 100 is fastened to the second rack 12 by screws. The rotating member 40 is rotated toward the expansion card 100 and abuts a top of the front end of the expansion card 100. The hooks 45 engage with the top walls bounding the notches 37. The front end of the expansion card 100 is sandwiched between the supporting member 30 and the rotating member 40. Thereby, the expansion card 100 is firmly fastened to the first rack 11 and the second rack 12.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A fastening device for an expansion card, comprising:
a first rack;
a second rack opposite to the first rack to fix a first end of the expansion card;
a supporting member fastened to the first rack, a pole extending up from the supporting member; and
a rotating member rotatably connected to the supporting member;
wherein when the rotating member is rotated up, a second end of the expansion card opposite to the second rack is operable to abut a top of the supporting member and the pole extends through a mounting hole defined in the second end of the expansion card, the rotating member is operable to rotate down to abut a top of the expansion card and engage with the supporting member.

2. The fastening device of claim 1, wherein the first rack comprises a fastening plate and an extension plate extending from a rear side of the fastening plate, a supporting plate extends forward from a top of the extension plate, the supporting member is fastened to the supporting plate and the fastening plate.

3. The fastening device of claim 2, wherein the fastening plate defines a first through hole, two pivot portions extend forward from opposite ends of a front wall of the supporting member, each pivot portion defines a second through hole, a sleeve is formed on a front side of the supporting plate, located between the pivot portions and aligned with the second through holes, a pin engages in the second through hole away from the fastening plate and extends through the supporting member, the sleeve, and then engages in the first through hole.

4. The fastening device of claim 3, wherein the supporting plate defines an opening, a substantially L-shaped hook is formed on the supporting member, to extend through the opening and engage with a bottom surface of the supporting plate.

5. The fastening device of claim 3, wherein the pin includes a head for abutting a sidewall of the supporting member away from the fastening plate, a screw hole is axially defined in an end of the pin opposite to the head, a screw engages in the screw hole.

6. The fastening device of claim 3, wherein a supporting portion extends back from an end of a rear wall of the supporting member, having the same height as the rear wall, the pole extends up from a bottom wall of the supporting portion.

7. The fastening device of claim 1, wherein a pivot hole is defined in each of opposite sidewalls of the supporting member, two pins extend from opposite ends of the rotating member and engage in the pivot holes.

8. The fastening device of claim 7, wherein two resilient arms are formed on opposite ends of a front side of the rotating member, the pins extend from the resilient arms.

9. The fastening device of claim 1, wherein the supporting member defines a cutout in each of opposite sidewalls of the supporting member, extending through a rear end of the sidewall, when the rotating member is rotated up, the second end of the expansion card abuts rear ends of the sidewalls and a rear wall of the supporting member, the second end of the expansion card abuts the sidewalls through the cutouts.

10. The fastening device of claim 9, wherein a notch is defined in each sidewalls of the supporting member, communicating with the corresponding cutout, two substantially L-shaped hooks are formed on opposite ends of the rotating member and engage with top walls bounding the notches.

* * * * *